US008219592B2

(12) United States Patent
Alpern et al.

(10) Patent No.: US 8,219,592 B2
(45) Date of Patent: *Jul. 10, 2012

(54) METHOD AND SYSTEM FOR USING OVERLAY MANIFESTS TO ENCODE DIFFERENCES BETWEEN VIRTUAL MACHINE IMAGES

(75) Inventors: Bowen L. Alpern, Peekskill, NY (US); Glenn Ammons, West Chester, PA (US); Vasanth Bala, Rye, NY (US); Todd W. Mummert, Danbury, CT (US); Darrell C. Reimer, Tarrytown, NY (US); Arun Thomas, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 1168 days.

This patent is subject to a terminal disclaimer.

(21) Appl. No.: 12/040,677

(22) Filed: Feb. 29, 2008

(65) Prior Publication Data
US 2009/0222474 A1    Sep. 3, 2009

(51) Int. Cl.
*G06F 17/30*    (2006.01)
*G06F 11/00*    (2006.01)
(52) U.S. Cl. ............................................ 707/803; 714/1
(58) Field of Classification Search .................. None
See application file for complete search history.

(56) References Cited

U.S. PATENT DOCUMENTS

| 7,243,089 | B2 | 7/2007 | Becker-Szendy et al. |
| 7,263,521 | B2 | 8/2007 | Carpentier et al. |
| 7,356,679 | B1 | 4/2008 | Le et al. |
| 7,454,443 | B2 | 11/2008 | Ram et al. |
| 2005/0132179 | A1* | 6/2005 | Glaum et al. ................... 713/1 |
| 2006/0089995 | A1 | 4/2006 | Kerr et al. |
| 2007/0094348 | A1 | 4/2007 | Scheidel et al. |
| 2007/0101146 | A1 | 5/2007 | Louch et al. |
| 2007/0204166 | A1 | 8/2007 | Tome et al. |
| 2007/0208719 | A1 | 9/2007 | Tran |
| 2007/0239695 | A1 | 10/2007 | Chakra et al. |
| 2008/0034000 | A1 | 2/2008 | Waldo et al. |
| 2008/0140700 | A1 | 6/2008 | Carpentier et al. |
| 2009/0094247 | A1* | 4/2009 | Fredlund et al. ............... 707/10 |
| 2009/0328225 | A1* | 12/2009 | Chambers et al. ............. 726/26 |
| 2010/0057795 | A1 | 3/2010 | Fontijn et al. |

OTHER PUBLICATIONS

Darrell et al "Opening Black Box: Using Semantic Information to Combat Virtual Machine Image Sprawl" dated Jan. 7, 2008.*

(Continued)

*Primary Examiner* — Tarek Chbouki
(74) *Attorney, Agent, or Firm* — William J. Stock; F. Chau & Associates, LLC

(57) ABSTRACT

A method for creating a virtual machine image, includes: storing a first image manifest for a first virtual machine image, the first image manifest including a mapping from file names of the first virtual machine image to content descriptors; storing a second image manifest for a second virtual machine image, the second image manifest including a mapping from file names of the second virtual machine image to content descriptors; creating a first overlay mapping by: placing a file name and its content descriptor both from the second image manifest in the first overlay mapping; and placing a file name and its content descriptor both from the first image manifest in the first overlay mapping if the file name and its content descriptor are not mapped in the second image manifest; and constructing a third virtual machine image having an image manifest whose mapping is the first overlay mapping.

17 Claims, 8 Drawing Sheets

OTHER PUBLICATIONS

B. Alpern, J. Auerbach, V. Bala, T. Frauenhofer, T. Mummert, and M. Pigott. PDS: a virtual execution environment for software deployment. In Proceedings of the First ACM/USENIX International Conference on Virtual Execution Environments (VEE '05), pp. 175-185, Chicago, IL, USA, Jun. 2005.

M. Burgess. A tiny overview of cfengine: Convergent maintenance agent. In Proceedings of the First International Workshop on Multi-Agent and Robotic Systems (MARS/ICINCO), Barcelona, Spain, Sep. 2005.

R. Chandra, N. Zeldovich, C. Sapuntzakis, and M.S. Lam. The collective: A cache-based system management architecture. In Proceedings of the Second Symposium on Networked Systems Design and Implementation (NSDI '05), pp. 259-272, Boston, MA, USA, May 2005.

E. Dolstra and A. Hemel. Purely functional system configuration management. In Proceedings of the Eleventh Workshop on Hot Topics in Operating Systems (HOTOS XI), San Diego, California, USA, May 2007. USENIX.

D. Lutterkort and M. McLouglin. Manageable virtual appliances. In Proceedings of the 2007 Ottawa Linux Symposium, pp. 293-302, Ottawa, Ontario, Canada, Jun. 2007.

A. Muthitacharoen, B. Chen, and D. Mazieres. A low-bandwidth network file system. In Proceedings of the Eighteenth ACM Symposium on Operating Systems Principles (SOSP '01), pp. 174-187, Banff, Alberta, Canada, Oct. 2001.

K. Park, S. Ihm, M. Bowman, and V.S. Pai. Supporting practical content-addressable caching with czip compression. In Proceedings of the 2007 USENIX Annual Technical Conference (USENIX '07), pp. 185-198, Santa Clara, CA, USA, Jun. 2007.

B. Pfaff, T. Garfinkel, and M. Rosenblum. Virtualization aware file systems: getting beyond the limitations of virtual disks. In Proceedings of the Third Symposium on Networked Systems Design and Implementation (NSDI '06), pp. 353-356, San Jose, CA, USA, May 2006.

S. Quinlan and S. Dorward. Venti: A new approach to archival storage. In Proceedings of the First USENIX conference on File and Storage Technologies (FAST '02), Monterey, California, USA, Jan. 2002.

C. Sapuntzakis, D. Brumley, R. Chandra, N. Zeldovich, J. Chow, M.S. Lam, and M. Rosenblum. Virtual appliances for deploying and maintaining software. In Proceedings of the Seventeenth Large Installation Systems Administration Conference (LISA '03), pp. 181-194, San Diego, CA USA, Oct. 2003.

S. Tang, Y. Chen, and Z. Zhang. Machine bank: Own your virtual personal computer. In Proceedings of the Twenty-first IEEE International Parallel and Distributed Processing Symposium (IPDPS '07), pp. 1-10, Long Beach, California, USA, Mar. 2007.

T.Y. Ts'o and S. Tweedie. Planned extensions to the linux ext2/ext3 filesystem. In Proceedings of the USENIX 2002 Annual Technical Conference, Freenix Track (FREENIX '02), pp. 235-244, Monterey, California, USA, Jun. 2002.

\* cited by examiner

```
struct VirtualImageManifest{
      int  manifestVersion;
      int  encodeMethod;
      u64  imageSize;
      int  numberOfPartitions;
      PartInfo  partitionInfo;
      Checksum  fileManifestChecksum;
      ContentDesc  fileManifestContentDesc;
      Checksum  contentManifestChecksum;
      ContentDesc  contentManifestContentDesc;
};
struct FileManifest{
      int  manifestVersion;
      int  encodeMethod;
      FileMfstEntry **  fileMfstEntry;
};
struct FileManifestEntry{
      int  entrySize;
      Checksum  fileChecksum;
      Metadata  fileMetadata;
      u32  contentDescriptorIndex;
      char  *  fileName;
};
struct ContentManisfest{
      int  manifestVersion;
      int  encodeMethod;
      ContentDesc **contentMfstEntries;
};
```

FIG. 2

METHOD AND SYSTEM FOR USING OVERLAY MANIFESTS TO ENCODE DIFFERENCES BETWEEN VIRTUAL MACHINE IMAGES

RELATED APPLICATIONS

This application is related to commonly assigned U.S. application entitled "Method and System for Using Semantic Information to Improve Virtual Machine Image Management", Ser. No. 12/040,509, commonly assigned U.S. application entitled, "Method and System for Separating File System Metadata from Other Metadata in Virtual Machine Image Format", Ser. No. 12/040,587 and commonly assigned U.S. application entitled, "Method and System for Separating Content Identifiers from Content Reconstitution Information in Virtual Machine Images", Ser. No. 12/040,643, all filed concurrently herewith, the disclosures of which are all incorporated by reference herein in their entirety.

BACKGROUND OF THE INVENTION

1. Technical Field

The present invention relates to a method and system for using overlay manifests to encode differences between virtual machine images.

2. Discussion of the Related Art

Visualization is widely touted as a solution to both client-side and server-side problems in large enterprises. On the server-side, the problem is physical server sprawl, i.e., the tendency for enterprises to accumulate underutilized, heterogeneous, power-hungry, unmanageable servers. The virtualization solution is to replace each server with a virtual machine image (perhaps a software appliance) and run these images on a smaller number of well-utilized, homogeneous, thrifty, and centrally managed machines. Clients suffer from their own kind of sprawl, because, unless clients are centrally managed, no two clients are exactly alike, yet all must be kept up-to-date with the latest software. A virtualization solution is to distribute client-side software as software applications, which encapsulate an application together with a complete, configured environment.

Virtual machine images are convenient because they can be treated as data, but they also are subject to sprawl. As data, images can be cloned, versioned, stored in archives, and transformed; while physical servers cost money, creating a new image is "free". However, these images must still be stored, and worse, because each image contains a full stack of software, each image must be maintained. This problem has been called virtual machine image sprawl or just image sprawl. Of course, an enterprise could avoid sprawl by creating only a few virtual machines, but this strategy forgoes some advantages of virtualization, such as stronger isolation between applications and a record of changes to applications.

Accordingly, there exists a need for a technique of combating virtual machine image sprawl.

SUMMARY OF THE INVENTION

In an exemplary embodiment of the present invention, a method for creating a virtual machine image, comprises: storing a first image manifest for a first virtual machine image, the first image manifest including a mapping from file names of the first virtual machine image to content descriptors; storing a second image manifest for a second virtual machine image, the second image manifest including a mapping from file names of the second virtual machine image to content descriptors; creating a first overlay mapping by: placing a file name and its content descriptor both from the second image manifest in the first overlay mapping; and placing a file name and its content descriptor both from the first image manifest in the first overlay mapping if the file name and its content descriptor are not mapped in the second image manifest; and constructing a third virtual machine image having an image manifest whose mapping is the first overlay mapping.

The overlay mapping is a list of mappings. A first mapping in the list of mappings is the mapping in the first image manifest and a second mapping in the list of mappings is the mapping in the second image manifest.

The method further comprises: storing a fourth image manifest for a fourth virtual machine image, the fourth image manifest including a mapping from file names of the fourth virtual machine image to content descriptors; and creating a second overlay mapping by: placing a file name and its content descriptor both from the fourth image manifest in the second overlay mapping; and placing a file name and its content descriptor both from the first overlay mapping in the second overlay mapping if the file name and its content descriptor are not mapped in the first overlay mapping; and constructing a fifth virtual machine image having an image manifest whose mapping is the second overlay mapping.

In an exemplary embodiment of the present invention, a method for creating a virtual machine image, comprises: creating an image manifest for a virtual machine image, the image manifest including a mapping from names of files in the virtual machine image to unique IDs identifying content of the files in the virtual machine image, wherein the image manifest is associated with a store that maps the unique IDs contained in the image manifest to content.

The image manifest when used in conjunction with the store is the virtual machine image.

The mapping is created by a sequence of overlay mapping elements. Each element modifies a mapping defined by preceding elements. An empty sequence specifies a null mapping in which no file names are mapped.

At least one of the elements includes a list of pairs, a first item of a pair being a file name and a second item of the pair being a unique ID, wherein the element modifies an existing mapping by changing the existing mapping so that file names in the list can be mapped to corresponding unique IDs.

At least one of the elements includes a deletion list that includes file names, wherein the element modifies an existing mapping by changing the existing mapping so that file names in the deletion list are not mapped.

At least one of the elements is a mapping from file names to unique IDs, wherein the element modifies an existing mapping by changing the existing mapping so that file names that are mapped in the mapping of the element are mapped to values of which they are mapped to by the mapping of the element. The mapping of the element is the mapping of an existing image manifest.

In an exemplary embodiment of the present invention, a method for customizing a first virtual machine image, comprises: formatting a second virtual machine image by creating an image manifest for the second virtual machine image that includes a mapping from file names of the second virtual machine image to content descriptors for file content of corresponding files in the second virtual machine image, wherein the content descriptors enable reconstruction of the corresponding content from information included in a store; and wherein the mapping included in the image manifest of the second virtual machine image is specified by a sequence of overlay elements, the first overlay element being a reference to the image manifest of an original virtual machine image, the second overlay element being a mapping that maps a name of a modified file that has different content than the two virtual machine images to a content descriptor of the content in the second virtual machine image.

Information needed to reconstruct the content of the modified file in the second virtual machine image from the content descriptor is contributed to the store.

The content descriptor for the modified file includes a collision resistant hash of the content of the modified file in the second virtual machine image.

The second overlay element is a list of pairs that includes at least a single pair.

The second overlay element is a reference to an image manifest whose mapping maps the name of the modified file to the content of the modified file in the second virtual machine image.

In an exemplary embodiment of the present invention, a method for creating a new virtual machine image, comprises: incorporating an update to an original virtual machine image to a new virtual machine image, wherein the new virtual machine image is encoded as an image manifest containing a mapping from file names to content descriptors and a store, wherein content of the files of the new virtual machine image can be reconstructed from the content descriptors using information in the store, and the mapping is an overlay mapping with three elements, wherein the first element is a reference to an image manifest for the original virtual machine image, the second element is a list of file names to be deleted from the mapping of the image manifest of the original virtual machine image, and the third element is a mapping from file names to content descriptors.

The mapping of the third element maps the name of a file that is not mapped by the mapping of the image manifest of the original virtual machine image to a content descriptor.

The mapping of the third element contains the name of a file that is mapped by the mapping of the image manifest of the original virtual machine image to a content descriptor that is different from the content descriptor to which the file name is mapped by the mapping of the image manifest of the original virtual machine.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 2 shows the structure of manifests according to an exemplary embodiment of the present invention;

DETAILED DESCRIPTION OF EXEMPLARY EMBODIMENTS

1. Introduction

Figure 1:
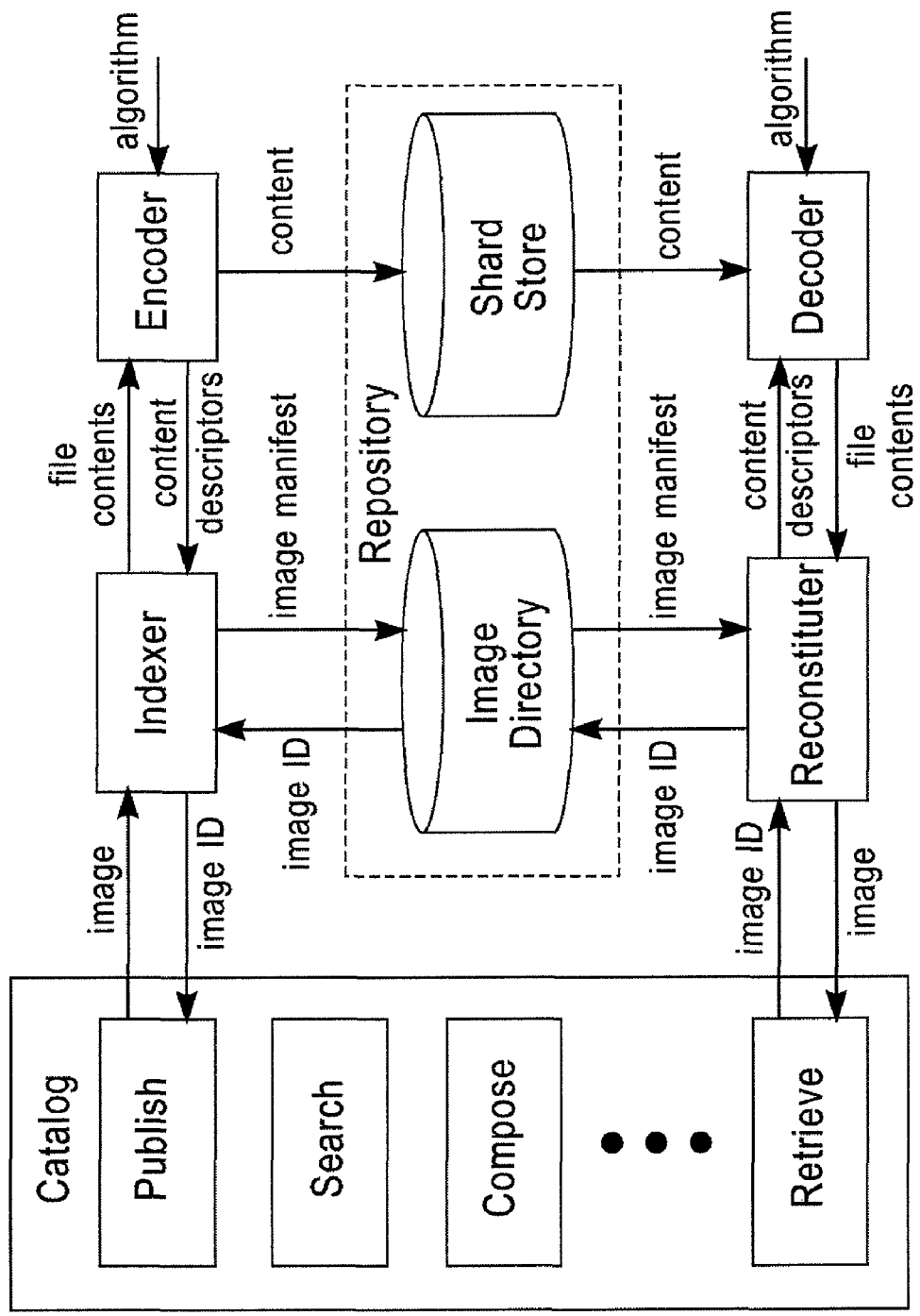
FIG. 1 shows the architecture of a system according to an exemplary embodiment of the present invention.

This invention addresses image sprawl by treating images as structured data, stored in a centrally managed repository. A new storage format in accordance with an exemplary embodiment of the present invention, the Mirage Image Format (MIF), exposes the rich semantic information currently buried in disk-image files. Disk-image files (also known as virtual machine images) contain an implicit mapping from file name to file content (and file metadata). To access this mapping, one must have the complete image, and, for some tasks, the image must be started. By contrast, MIF decouples this mapping into a manifest that maps file names to content descriptors (and metadata) and a store that holds content.

MIF has several advantages. It saves space because a file's content is stored only once, even if that content appears in more than one image or multiple files of the same image. Thus, some software management tasks that used to require complete images now require only manifests and/or partial images. These tasks can be performed without starting the image and, because manifests are simpler and orders of magnitude smaller than disk-image files, without transferring large amounts of data. Section 5 presents examples, modeled on real-world usage scenarios that include searching a repository for images that contain a particular file, deploying customized "clones" of a base image, and upgrading a large number of similar images with a new software package. For these tasks, operating on manifests and partial images is up to two orders of magnitude faster than operating on disk images.

Some of the contributions of the invention are:

A new image format (MIF) that exposes the semantic information implicit in virtual machine images. Images in MIF can be stored compactly. As with current formats, images in MIF fully encapsulate application state including all software dependences. Further, it is easy to convert between MIF and conventional disk-image formats.

Analyses and optimizations that exploit MIF to improve software management tasks. By operating on manifests and partial images, we obtain orders-of-magnitude speedups for inventory control, customized deployments, and software updates.

The remainder of the description is organized as follows. Section 2 explains the software management tasks that motivate this work. Section 3 discusses the design and implementation of MIF, the repository, and the analyses and optimizations that rely thereupon. Section 4 presents three real-world software management scenarios and explains how we modeled them in our experiments. Section 5 evaluates the performance of the proposed system on those models. Finally, Section 6 concludes the description.

2. Motivation

The invention is motivated by three software tasks: inventory control, customized deployment, and updates. This section explains these tasks with a focus on how sprawl—both physical and virtual—makes them difficult to deal with.

Inventory control deals with determining what software is installed where. Inventory control is important for many reasons: enterprises pay for most commercial software on a per-installation basis; for reliability, installed software must be kept at known version levels and updated or patched systematically; installing some software, such as file-sharing software, at the enterprise is legally risky or simply unethical; and installing other software, such as viruses, can damage the enterprise's systems.

There are many commercial products for controlling the inventory of physical machines, including virus scanners and compliance checkers such as, IBM's Tivoli License Compliance Manager available at http://www.ibm.com/software/tivoli/products/license-mgr/, all of which work similarly. These products install an agent on each machine that periodically scans the file system, determines which software is installed, and sends a report to a central server. In many cases, the software in question could be installed anywhere on the system, so these products do not search for files by name. Instead, they compute a cryptographic checksum of each file's contents and compare the checksum to a database of known hashes.

This invention deals with two aspects of this method of inventory control. First, it ensures that the agent is installed properly on each machine is itself. Second, since scanning every file system is expensive, even when optimized, the invention scans each image only once, as it is added to a centrally managed repository. This scan is "for free" because the image must be transferred to the repository anyway. After the scan, inventory control queries become queries over manifests, which can be evaluated quickly.

Deploying software in the face of sprawl is a huge challenge for most enterprises. The enterprise must determine which machines or images are eligible for the deployment; this is a difficulty with inventory control. Next, the enterprise must install and validate the software on each server or image. Installing, enterprise software can be an arduous task.

Virtualization should help, because the software could be installed and validated on one "master" image, which could then be cloned to run on many virtual machines. However, sprawl says that the enterprise needs many heterogeneous images. Even in the simplest environment, each instance of the master needs a unique host name and IP address. Therefore, either the new software must be deployed to many images, or the master image must be customized to produce many instances, each with a slightly different configuration.

Sprawl causes two difficulties here. First, changing many images takes time. Second, storing multiple images is costly unless their similarity is exploited. As Section 3 explains, our invention addresses the first difficulty through optimizations of deployment to or customization of many similar images. The second difficulty is addressed through a space-efficient encoding of images.

The final motivating task is updating software. The effect of sprawl on this task is obvious: the greater the variety of machines or images that must be updated, the more difficult the task. As in customized deployment, eligible machines or images must be identified and the update must be installed on each eligible machine. However, unlike customized deployment, updating software makes a single big change to many different machines or images. The same features of the invention that support customized deployment also support updates, but updates require a further optimization: identifying a generic portion of the update and executing it on manifests instead of on individual images.

3. Design and Implementation

This section describes the design and implementation of MIF and the Mirage repository. We explain the goals of the design, its implementation, and how it improves three software management tasks: inventory control, customized deployment, and updates. Finally, we discuss implementation of the design.

Two important goals conflict. The chief goal of MIF is to represent files explicitly, since files are the building blocks of any virtual machine image. However, a second goal is that there are few constraints on the images represented in MIF. In particular, the image's operating system or target virtual machine monitor should not matter.

The first goal requires that, on converting an image to MIF, each file system in the image must be traversed. So, one constraint on images is that they must contain only file systems that the current implementation can traverse. At this time, only the Ext2 and Ext3 file systems as discussed in T. Y. Ts'o and S. Tweedie. Planned extensions to the Linux ext2/ext3 file system. In Proceedings of the USENIX 2002 Annual Technical Conference, Freenix Track (FREENIX '02), pages 235-244, Monterey, Calif., USA, June 2002, are supported (see discussion in Section 3.2). However, it is contemplated that additional file systems will be supported. For example, it would be easy to support a file system that has a Linux driver, since the indexer (shown in FIG. 1 and described below) traverses each file system with the kernel's own drivers. Indexing file systems without a Linux driver may also be supported, as would indexing hierarchical namespaces, like the Windows registry.

An assumption of Mirage is that many images in the repository will be similar to one another. Three goals rely, at least in part, on this assumption:

Storage efficiency. Many of the images in the repository will share files, and this redundancy must be exploited.

Fast retrieval. Retrieving an image must take time proportional to the size of the image's difference from previously retrieved images.

Support for analyses and optimizations. For example, it should be possible to analyze the effect of an update and use that information to speed updates to similar images.

FIG. 1 shows the architecture of a system according to an exemplary embodiment of the present invention. Each block in the figure corresponds to a library (not a process). To interact with the system, clients use the catalog interface (left side of the figure), which has operations for publishing images, listing images (not shown), retrieving images or parts of images, searching for images that contain particular files, and composing images (see discussion below).

The repository, which consists of two parts, is in the center of FIG. 1. The image directory lists the unique identifier of each image in the repository. This identifier also identifies the image's manifest (see discussion below). The content-addressed shard store holds the rest of the data in the system: manifests, persistent data structures for the catalog, and of course, the contents of files. The term "shard" is our name for an atomic chunk of data and is inherited from B. Alpem, J. Auerbach, V. Bala, T. Frauenhofer, T. Mummert, and M. Pigott. PDS: a virtual execution environment for software deployment. In Proceedings of the First ACM/USENIX International Conference on Virtual Execution Environments (VEE '05), pages 175-185, Chicago, Ill., USA, June 2005, a copy of which is incorporated by reference herein in its entirety. Shards are added to the store by the encoder and retrieved by the decoder, each of which is parameterized by an algorithm that determines how shards are identified; currently, the identifier of a shard is its SHA1 checksum. An example of computing such a checksum is described in National Institute of Standards and Technology. FIPS PUB 180-1: Secure Hash Standard. April 1995. Supersedes FIPS PUB 180 1993 May 11.

In between the catalog and the shard store, the indexer converts images to manifests and the reconstituter converts manifests back to images or to file trees. Manifests are the central data structure of the system and there are three kinds, whose structure is as listed in FIG. 2.

A virtual machine image manifest or image manifest represents an image and stores three kinds of information. First, an image manifest describes the image, such as its size and the type, and size and location of each of its partitions. Second, an image manifest specifies the algorithm used to encode the image. Finally, the image manifest stores references to a file manifest and a content manifest.

The file manifest lists each file system path in the image along with its metadata (note that on Unix operating systems, the metadata includes the data retuned by the stat system call), and, for paths to regular files, its file checksum and content-descriptor index. The file checksum, which varies with the encoding method, is a collision-resistant hash (currently SHA1): with very high probability. Two files that have the same file checksum have identical contents.

The content-descriptor index is used to find the content-descriptor of the file's content in the content manifest. The structure of content descriptors will vary with the encoding method. The current method stores the contents of each (unique) file as a single shard. For this method, the content descriptor is the identifier of that shard.

Separating file manifests and content manifests allows encoding methods and shard-store formats to evolve separately. For example, the shard store could be migrated to use a new kind of shard identifier without changing file manifests. Similarly, if an encoding method that stores deltas between similar file contents were desired, the new encoding method could be implemented by augmenting the content descriptors without changing the code that interacts with the shard store.

A brief discussion regarding portioning and repartitioning disks is now provided.

A physical machine may have multiple physical disks attached to it. Each physical disk is broken into one or more partitions. Each partition contains zero or more file systems (mappings from hierarchical file names to file content and file metadata). Conventional virtual machine images contain in one file all the information about a (possible) physical machine. This information includes: the names and sizes of the physical machine's disks, the number and sizes of partitions of those disks, and the assignment of file systems to partitions, as well as all of the file system information. The insight behind this invention is that, if the information in a virtual machine image is arranged appropriately, certain operations can be performed without referencing the file system information (which constitutes the overwhelming bulk of the virtual machine image). Such operations include repartitioning the virtual machine images: adding, deleting, resizing or renaming the disks; adding, deleting, or resizing the partitions of a particular disk; and changing the assignment of file systems to partitions. By changing the sizes of disks (and their partitions), the virtual image itself may be resized.

If a virtual machine image is of a virtual machine that is running (as opposed to shut-down/not-yet-started), then the virtual machine must contain a memory snapshot which contains the state of the running virtual machine's volatile memory. This snapshot is not logically part of the virtual machine's file system data. Certain operations can be performed on this memory snapshot without accessing file system data. Such operations include: determining if a particular program is currently running on the virtual machine, and, if so, killing it. Other such operations might include: listing all programs running on the virtual machine, searching for evidence of memory leaks, symbolically debugging a running program, etc.

Other information about the state of a virtual machine that is currently encoded on file systems might profitably be refractored out of them to allow further customization of virtual machine images without accessing file system data. Such information might include: a registry (like the Windows Registry), environment variable assignments (name-value pairs), user name and user password information, IP addresses, device information, device drivers, etc.

3.1 Analyses and Optimizations

We have built several analyses and optimizations that exploit MIF. These extensions address the inventory control, customized deployment, and image update problems introduced in Section 2.

The inventory control task is "given a list of file contents, find all images that contain a file with content from the list". Conventionally, this is done by scanning each image (physical or virtual) for a match. By contrast, for images in MIF, the images are found by searching each file manifest for checksums that match the target content's checksum. Essentially, MIF records the result of scanning each file's content so that the scan need not be repeated.

There are a number of ways to implement the search. One way is as follows. First, build a hash table that stores a cryptographic checksum of each content in the list. Retrieve the manifest of the image to be searched from the repository. Finally, walk the file manifest and, for each file, report a match if the file's checksum is in the hash table. A more elaborate implementation would avoid a linear search of each manifest by building a map of checksums to manifests and reusing the map for searches of multiple images. Section 5 shows that the simpler implementation can search a single image in one or two seconds.

MIF also enables custom deployment of virtual-machine images. If multiple instances of an image are to be deployed on a network of virtual machines, each instance must be assigned a unique hostname. On a Unix system, changing the hostname may require changing a single file: /etc/hostname. To support such small customizations efficiently, Mirage implements selective retrieval and manifest composition.

Selective retrieval retrieves selected files from an image instead of the image itself. For the hostname example, one would retrieve the file /etc/hostname and no other files. Note that the time for a selective retrieval is proportional to the size of the image's manifests and the size of the files requested and not to the size of the image.

Manifest composition adds or replaces files in an image with files from another manifest, producing a new image in the repository. For hostname customization, a unique hostname would be stored in /etc/hostname and a tiny file manifest that contains just this file would be published. Such tiny file manifests are called overlay manifests. Finally, the customization would compose a new overlay manifest with the original manifest to create the customized image in the repository. The time for manifest composition is proportional to the size of the manifests used to create the new image.

Section 4 shows that selective retrieval and image composition result in significant speedups for installation of Debian packages as well as for hostname customization.

The image update optimization exploits the assumption that many images in the repository will be similar to one another. Updates fall into two classes: image-specific updates and generic updates. An image-specific update depends on details of the image that are unlikely to recur in other images, while a generic update depends on features that are common to many images.

This optimization uses memoization to speed up generic updates. In general, to memoize a function, one maintains a table that maps function arguments to function results. Before the function is computed for a given argument, the table is consulted to see if it already contains a result for that argument. If so, the computation need not be repeated. If not, the computation is performed and a new argument-result pair is added to the table.

In this case, the function is a generic update script, which must be deterministic. Given a command line, the script reads and writes files. A "function argument" in the memoization table is a command line together with that part of the image state that the script reads when given that command line. In the current implementation, this part of the image state is encoded as a list of paths (of files read by the script) together with the checksums for (the initial contents of) these files. A "function result" in the memoization table records the list of paths or files altered by the script together with checksums of their final contents. The results are stored as overlay manifests. Note that the argument does not depend on files that the script does not read (with a given command line), nor does the result list files that the script does not alter.

To apply an update script to an image, the memoization table (a hash table that is stored in a well-known location in the repository) is checked for an earlier run of the script with the same command line on files that exactly match those in the image. If a match is found, then a new image is created by composing the image with the match's overlay manifest, without actually running the update script. The time for this operation is proportional to the size of the table entry (both the argument and the result) and not to the size of the input files that the script would have accessed.

If the desired entry is not found in the table, then the update script is run on the image. After running the script, the appropriate entry is added to the memoization table.

Mirage uses Strace, available at http://sourceforge.net/projects/strace, to identify files read and written during script executions.

Memoization does not apply to image-specific updates. However, some image-specific updates can be split into two updates, one of which is generic. Section 4 describes how we performed such a split of Debian's update tool, Dpkg.

More details are now provided regarding the overlay manifest and an overlay sequence.

A shard store maps unique IDs to file content. With high probability, two different contents get different unique IDs and two different files with the same content get the same unique ID.

An image manifest for a virtual machine image contains a mapping from file names to the unique IDs identifying the content of the named files in the virtual machine image (or to content descriptors which describe how to reconstruct the content of the named files). Names that do not correspond to files in the virtual machine image are not mapped at all by the mapping. There are many forms in which such a mapping can be expressed. One of these is as a list of file name/unique ID pairs. Another is as a sequence of overlay mapping elements. In such a mapping, each element modifies the mapping represented by the preceding elements. Usually, an empty sequence will represent the null mapping in which no names are mapped. An overlay mapping element may itself be a mapping. In this case it takes precedence over the mapping defined by the elements that come before it: the resultant mapping maps names mapped by the element mapping exactly as the element mapping would; those names not mapped by the element mapping are mapped as the mapping defined by the earlier mapping would map them. By convention, one way to represent a mapping in an overlay mapping element is as a reference to an image manifest. In this case, the mapping represented by this overlay mapping element is the mapping of the referenced image manifest. An overlay mapping element may be a deletion list. This is a list of file names. Such a list modifies the mapping defined by the preceding elements so that file names that are on the list are not mapped while file names that are not on the list are mapped exactly as the mapping defined by the preceding elements would map them.

A technique for updating a virtual machine will now be discussed.

This is accomplished by first running a virtual machine under a hypervisor, running a script in the virtual machine created by running the virtual machine under the hypervisor and saving a state of the virtual machine as a new virtual machine image.

The hypervisor is modified to record (at least one of) the names of files read by the script, the name of files modified by the script, and the final content of the files modified by the script.

The unique content IDs of the content of files read by the script and the unique content IDs of the final content modified by the script are obtained.

Upon completion of the script, the final content of the files modified by the script together with their corresponding unique content IDs are contributed to the store, and (at least one of) the explicit parameters of the script, the names of the files read by the script, the names of the files modified by the script, and the unique content IDs of the final content of the files modified by the script are stored as an entry in a table.

Before the virtual machine image is run under the hypervisor, the table is searched for an entry such that the entry's explicit parameters match the explicit parameters of the script to be run. For each file name in the entry designating the name of a file read by the script when the script was created, the image manifest of the virtual machine to be updated contains that name and the indicated unique content IDs that match the corresponding unique content IDs from the table entry. For each file name in the entry designating a file modified by the script when the entry was created, the image manifest of the virtual machine to be updated contains that name. In the case that an entry in the table is found matching these criteria, the virtual machine image is not run under a hypervisor, and the updated virtual machine is updated as follows: the image manifest of the virtual machine image to be updated is copied, the copy is edited so that the unique content IDs of the files to be modified are replaced by the unique content ID of the final content of the files to be modified as obtained from the table entry.

When the names of files created by the script and the final content of the files created by the script are also recorded by the modified hypervisor, the unique content IDs of the final content of the files created by the script are obtained. The final content of the files modified by the script and their corresponding unique content IDs are contributed to the store and the names and the corresponding unique IDs for files created by the script are added to the table entry for the execution of this script. The previous matching step is augmented to check that the file names of the files to be created do not exist in the image manifest of the virtual machine image to be modified. If this modified test is satisfied by some table entry, the virtual machine image is not run under a hypervisor, and the updated virtual machine image is created as follows: a new image manifest is created with all the file names contained in the image manifest for the file to be updated, the file names created by the script corresponding to the names of the files modified by the script as indicated by the table entry are the unique content IDs of the final content of the modified file from the table entry, corresponding to the names of files created by the script are the unique content IDs of the final content of the created file from the table entry, and corresponding to names of files in the image manifest of the virtual machine image to be updated that are not modified by the script as indicated in the table entry are the unique content IDs corresponding to that file name in the image manifest of the virtual machine image to be updated.

When the names of files deleted by the script are also recorded by the modified hypervisor, the names of the files deleted by the script are added to the table entry for the execution of the script. The previous matching step is augmented to check that the names of the files deleted by the script as indicated in the table entry are present in the image manifest of the virtual machine image to be updated. If this modified test is satisfied by some table entry, the virtual machine image is not run under a hypervisor and the updated virtual machine image is created as follows: a new image manifest is created with all the file names contained in the image manifest for the virtual machine image to be updated that are not also in the list of names of the files modified by the script as indicated in the table entry, corresponding to the names of the files modified by the script as indicated in the table entry are the unique content IDs of the final content of the modified file from the table entry, and corresponding to names of files in the image manifest of the virtual machine image to be updated that are not modified by the script as indicated in the table entry and not deleted by the script as indicated in the table entry are the unique content IDs corresponding to that file name in the image manifest of the virtual machine image to be updated.

4. Usage Scenarios

For each software-management task listed in Section 2, this section describes a real-world scenario and explains how the scenario is modeled for evaluation in Section 5. In the inventory control scenario, images are searched for particular programs; in the customized deployment scenario, a cluster of servers is set up; and in the update scenario, a new package is installed on a number of clients.

4.1 Scenario: Search Images for Programs

In this scenario, images are searched for certain programs and a report is generated that lists which images contain which programs. Enterprises need such scans for a number of reasons: the programs may be commercial software with a per-seat license, the programs may need an upgrade, or the programs may be viruses or forbidden software that must be removed.

This scenario is modeled as a file-content search. For each program, there is an associated content. If an image contains a file with that content, then the program is installed on the image; otherwise, the program is not installed. The search is performed by comparing the content descriptors in image manifests with checksums of the associated contents, as described in Section 3.

The goal here is to show that file-content searches are about as fast with MIF as they would be with a conventional inventory control system. Conventional inventory control systems scan images (physical or virtual) and build a database of checksums; later, the database is used for searches. With MIF, searches are no faster but the database is built "for free" as a side-effect of adding images to the repository. Another benefit is that the database is always synchronized with the repository.

4.2 Scenario: Deploy a Cluster of Servers

In this scenario, a cluster of virtual servers is deployed to a cluster of physical machines. The new cluster might serve a new application at the enterprise or be used to increase the throughput of an old application. In either case, the repository stores a master image that contains the application and its environment. A number of instances are cloned from the master and customized to fit the physical cluster. For example, the master image might be fully configured except for its network settings.

The model for this scenario replaces the content of five network configuration files of the master image. For a typical installation, the total size of these files is about 50 kilobytes. Each instance is customized in four steps:
1. From the master, retrieve the five network-configuration files.
2. Change the five files.
3. Publish the customized files, creating an overlay manifest.
4. Compose the overlay manifest with the master to create the instance in the repository.

By contrast, a "conventional" approach would retrieve the entire master image and change the five files to create an instance, and publish the instance to the repository. With this approach, it is tempting to deploy the instances without publishing them; however, this is cheating, because deployed instances are not tracked by the repository. Section 5 shows that the Mirage approach achieves the same performance as the cheat while keeping the repository up-to-date; both the cheat and the Mirage approach are orders of magnitude faster than the conventional approach without the cheat.

4.3 Scenario: Install a Package on Clients

In this scenario, new software is installed on a number of clients. The software might support a new application at the enterprise or replace an old application's client-side code with the "latest and greatest" code. Large enterprises support many clients; often, no two clients are exactly alike.

The model assumes that it is enough to update the repository with new client images; some other mechanism must ensure that users run appropriate images. The model also assumes that the enterprise distributes software as packages, such as is common practice for Linux distributions and other systems. A package bundles related programs, data, and documentation into one file. The distribution's maintainers manage a repository of packages and each package lists its dependencies on other packages in the repository. Packages are installed by running a package installation tool; for example, on Debian: The universal operating system available at http://www.debian.org. Here, packages are installed with Dpkg. Dpkg maintains a package database on each image, which lists the package installed on that image.

When a simple package is installed on Debian, Dpkg must:
1. Verify that the package's dependences are satisfied by the packages already installed on the image.
2. Unpack the new package's files.
3. Configure the package by running the new package's post-installation script.

More complicated packages have a lengthier install sequence that involves running more scripts, but the above is common. Two of these steps will vary from one image to another. Step 1 varies with the image's package database, and step 3 varies with the new package's configuration.

By contrast, step 2 is the same for every image because the package's files are always the same. Also, step 2 is the slowest step for all but small packages. Therefore, if the system could remember the outcome of step 2 from an install on one image and reuse that outcome when installing on other images, the latter installs would be significantly faster.

In the experiments of Section 5, a Debian package is installed on images using an optimized Dpkg that exploits memoization, selective retrieval, and manifest composition (note that the optimized Dpkg does not support some of Dpkg's features. In particular, scripts that change the sate of a running system (for example, start or stop services) and upgrades of certain already installed packages do not work properly. Handling state of a running system is a research challenge, but we believe that all of Dpkg's other features could be supported efficiently). The optimized Dpkg splits installation into a generic part, which is memoized, and an image-specific part, which is not memoized. To install the package on the first image, the user tells Dpkg to execute these steps:

1. Create an overlay manifest for the unpacked package.
   (a) Unpack the package's files.
   (b) Publish the unpacked files, creating an overlay manifest.
2. Compose the overlay manifest with the first image, creating (in the repository) an image with the unpacked package.
3. Create an overlay manifest for the installed package.
   (a) Retrieve selected files from the image for the unpacked package. Only the files necessary to complete the installation are retrieved—typically, this does not include most of the files from step 1(a).
   (b) Configure the package by running the package's post-installation script in the context of the retrieved files.
   (c) Publish the resulting files, creating an overlay manifest.
4. Compose the overlay manifest for the installed package with the first image, creating (in the repository) an image with the installed package.

Step 1 is the generic part of the installation and is memoized. In this case, memoization is trivial, since the first step depends on none of the image's files. To install the package on subsequent images, the user tells Dpkg to execute steps 2 through 4.

In step 3(a), the list of files to retrieve depends on the package and (rarely) on the image. To construct the list, Strace was used to track all file accesses during a normal installation, a method that works only when the list does not depend on the image. A more general alternative is to declare this information within packages.

By contrast, a "conventional" approach would retrieve the entire image, install the package, and publish the image to the repository. Section 5 shows that (for a large package) the speedup of the above approach over the conventional approach is 2.3 on the first image and 21 on subsequent images. As with the last scenario, the conventional approach could cheat: instead of running the installation at the repository, force clients to run the installation on their own machines. This cheat distributes some (but not all) of the load but is harder to manage, especially when the clients are heterogeneous.

Speedup is not the only benefit of the invention. Package management tools for physical machines (such as Dpkg) assume that installing and removing packages are dangerous operations. These tools contain many guards against corrupting the system; for example, they ensure that certain operations are atomic. Because the invention stores images in a repository, with snapshots of each stage of the installation, corruption is not a concern, so package management tools can be simpler and perhaps amenable to more optimizations.

5. Results 5.1 Experimental Methodology/Setup

All experiments were run on an IBM X Series Blade, with IBM ESXS disks (146.8 GB, 16 MB buffer, 10000 rpm, 3.8 ms average seek time), 2 CPU Intel Xeon E5345 processors (2.33 GHz, 1333 HMz FSB, L1 Cache 32K, L3 Unified Cache), and 4 GB RAM. The operating system was Linux, Ubuntu 7.04 (kernel 2.6.20-1).

The methodology is as follows. All reported times are the median of three test runs; the variance was not significant in any of the experiments. Before each timed run, all pending writes are forced to disk with sync and the file system caches flushed with echo 3>/proc/sys/vm/drop_caches. Whenever data is written to disk, the time to force pending writes is included in the measurements.

The disk-image files for these experiments are raw disk images. Five different images were used, all based on the Debian Linux distribution and created as sparse files:
Small—A minimal install.
Base—A typical non-desktop install.
Wiki—An image with Apache, PHP, MySQL, and MediaWiki.
Big—A desktop image with X Windows and standard desktop productivity tools.
IDE—An image with a large, commercial, Eclipse-based development environment.

In addition to these images, experiments on multiple experiments used 40 images, all similar to IDE, generated from 40 successive builds of the development environment.

Table 1 lists each image and its characteristics, including the number of files it contains and its disk usage when monitored.

TABLE 1

| Name | Files ($10^3$) | Size (GB) | Manifest sizes (MB) | | | Time (s) | |
|------|----------------|-----------|---------------------|------|------|----------|------|
|      |                |           | Image               | File | Con. | Pub.     | Ret. |
| Small | 20 | 0.28 | 0.004 | 3.0 | 0.5 | 34 | 21 |
| Base  | 21 | 0.45 | 0.004 | 4.0 | 0.7 | 49 | 28 |
| Wiki  | 39 | 0.84 | 0.004 | 6.1 | 1.2 | 137 | 102 |
| Big   | 66 | 1.67 | 0.004 | 10.5 | 2.2 | 309 | 246 |
| IDE   | 79 | 2.24 | 0.004 | 13.1 | 2.4 | 451 | 353 |

5.2 Repository Performance 5.2.1 Performance on a Single Image

Table 1 also shows the sizes of the three manifests created for each image by Mirage. Image manifests are very small, roughly 4 KB and independent of image size or number of files. The sizes of the file manifests are roughly proportional to the number of files in the image. It is not exactly proportional because file names vary in length. In fact, the file manifest implementation stores the complete path name for every file, so there is redundancy that a smarter scheme could remove. Finally, the size of the content manifest is also roughly proportional to the number of files in the image. This is an artifact of the implementation's encoding method, which stores each file's content as a shard. Other encoding methods scale differently: for example, if the encoding method broke each file into chunks (all about the same size)

and stored each chunk as a shard, then the size of the content manifest would be roughly proportional to the size of the mounted image.

Finally, Table 1 shows the time to publish each image to the Mirage repository and to retrieve the image from the same repository. As an optimization, the publishing implementation avoids sending shards that already exist in the shard store by asking the shard store if it already has a given shard identifier before sending the shard. Publish times shown are for publishing the image to an empty repository.

Both publish and retrieve times are roughly proportional to the size of the mounted image. The times depend on how the file system underlying the shard store lays out files, how the operating system caches disk blocks, how the hard drive caches blocks, the pattern of store accesses, and so forth, so the times should not be expected to be exactly proportional to image size. The times in Table 1 are similar to the times for simply copying the mounted image's files with cp-a, as one would expect.

5.2.2 Performance on Multiple Images

A repository that performs well when storing one image is of no interest if it does not also perform well when storing many images. We do not have large image repositories yet, but we have evaluated Mirage on modestly-sized repositories. In the following, Mirage is compared with two other image-encoding schemes:

Raw—The repository stores images in a conventional "raw" disk format, with no comparison.

Gzip—The repository stores images in a conventional raw disk format and compresses each image with Gzip. Gzip is described in P. Deutsch. GZIP file format specification version 4.3. RFC 1952, Internet Engineering Task Force, May 1996.

Figure 3:
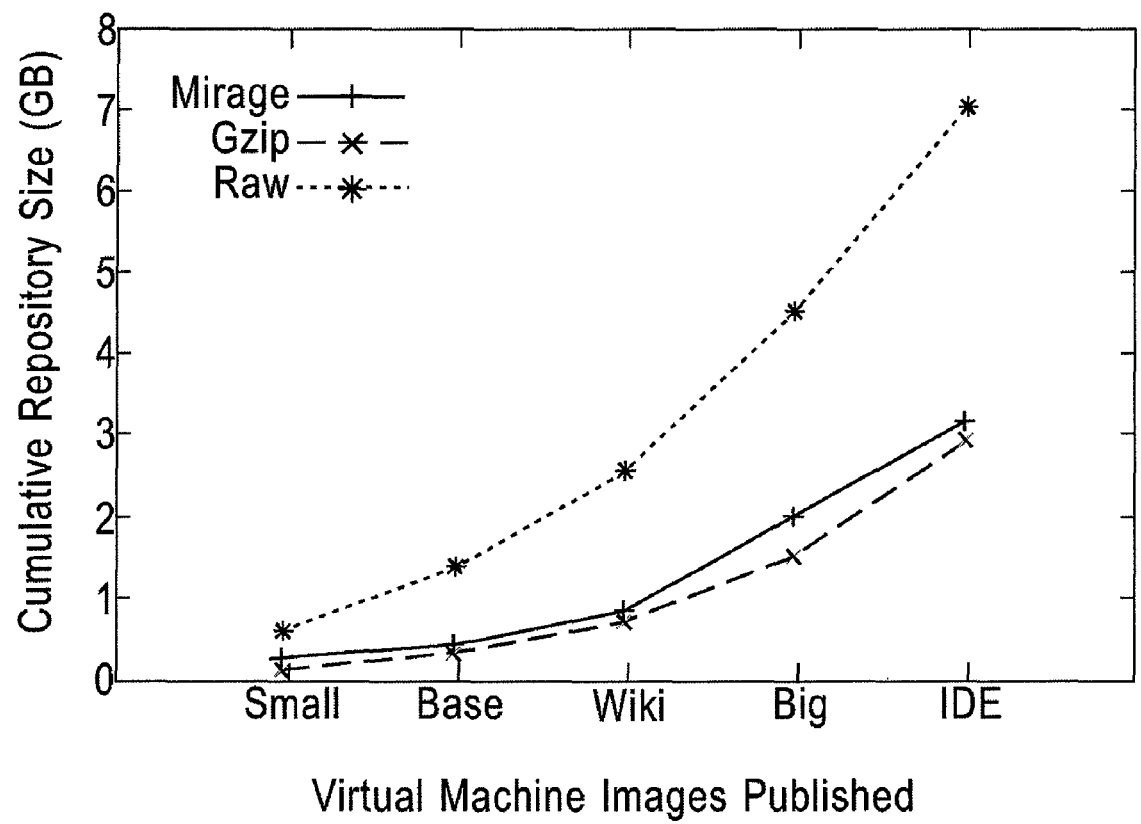
FIG. 3 shows the growth of a repository as five images are added, for a conventional Raw encoding scheme, conventional Gzip encoding scheme, and Mirage encoding scheme according to an exemplary embodiment of the present invention.
Figure 4:
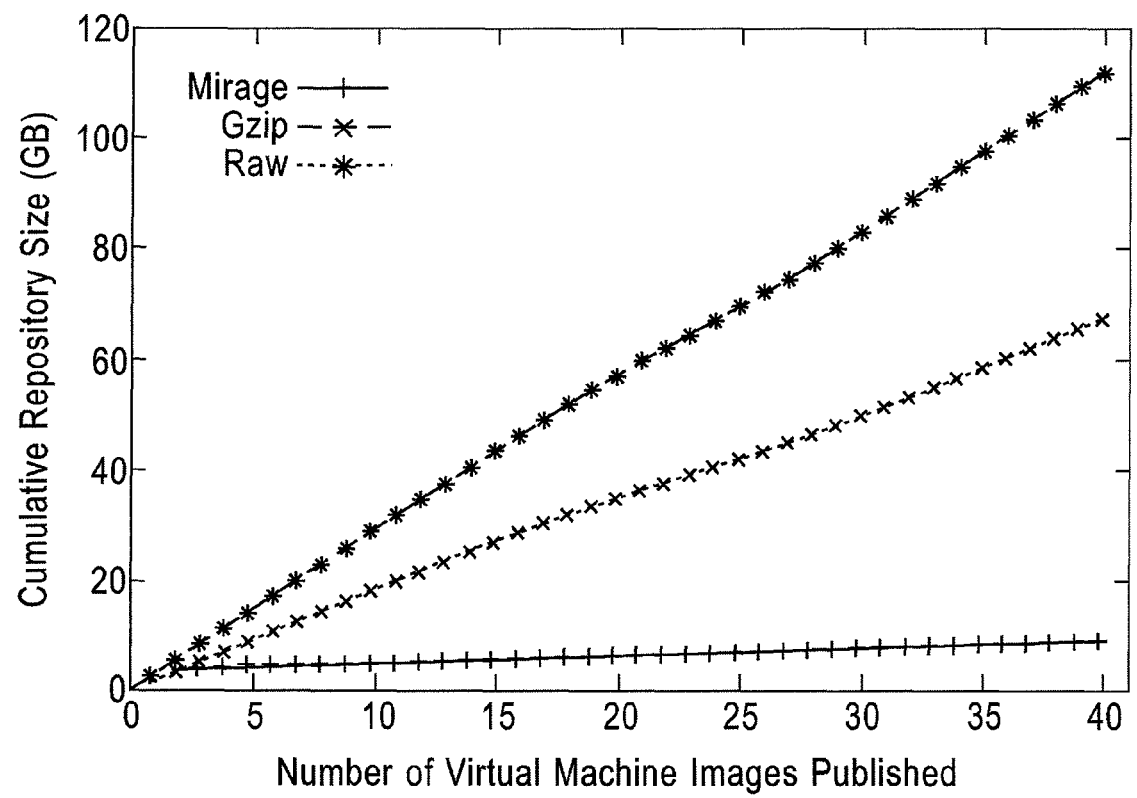
FIG. 4 shows the growth of a repository as 40 successive IDE images are added, for the Raw, Gzip, and Mirage encoding schemes.

FIG. 3 and FIG. 4 show how the space required by small repositories varies with how the images are stored. On a repository that contains only the five Debian images (FIG. 3), MIF does almost as well as Gzip, even though MIF does not compress individual files; instead, MIF achieves its space savings by storing each file content only once, even if it appears in multiple files. This advantage of MIF is clear in FIG. 4, which shows the storage cost of storing 40 consecutive IDE images in the repository. In this scenario, Mirage requires 9.9 GB, while Gzip requires 65 GB. Raw's storage cost is even higher, 108 GB. Here, Mirage is 6.5 times better than Gzip and 10.9 times better than Raw.

Table 2 compares the time required to publish and retrieve each of the 40 IDE images with Mirage to the time required with Gzip. On average, it takes Mirage 146 s to publish an image, compared to Gzip's 246 s (note that the high standard deviation is due to the cost of publishing the first image: publishing subsequent images is faster because many of their file contents already exist in the shard store). Thus, Mirage not only requires less space, but also publishes faster. However, retrieving images with Mirage is significantly slower than retrieving images with Gzip, because Mirage reads more data from disk and reads from many files instead of linearly through one data file.

TABLE 2

| | Time (s) | |
| Operation | Average | Std. Dev. |
| --- | --- | --- |
| Standard Gzip | 248 | 12 |
| Standard Gunzip | 146 | 12 |
| Mirage Publish | 109 | 35 |
| Mirage Retrieve | 599 | 21 |

5.3 Virtual Image Search/Inventory Control

Table 3 shows the times to search the five different virtual images stored in the Mirage repository for certain file checksums. The first test was to search each image for a single file checksum, the second test was to search for 1000 different checksums. Since the current implementation performs a linear scan of the file manifest, the time to search an image depends on the number of files in the image and the number of file checksums sought. Even with this straightforward implementation, searching the largest image (IDE) for 1000 different file checksums takes only 3 seconds.

TABLE 3

| | | Checksum Time (s) | |
| Name | Size (GB) | 1 File | 1000 Files |
| --- | --- | --- | --- |
| small | 0.28 | 0.5 | 1.2 |
| base | 0.45 | 1.1 | 1.3 |
| wiki | 0.84 | 1.6 | 1.9 |
| big | 1.67 | 2.2 | 3.0 |
| IDE | 2.24 | 2.6 | 3.2 |

5.4 Customized Deployment

This section evaluates the performance of MIF on the customized deployment scenario from Section 4.2. In this scenario, a master image is customized by replacing its network configuration files with new files. The size of the new file totaled 32 KB. As the master image, we used Base (a small image) and IDE (a large image).

Figure 5:
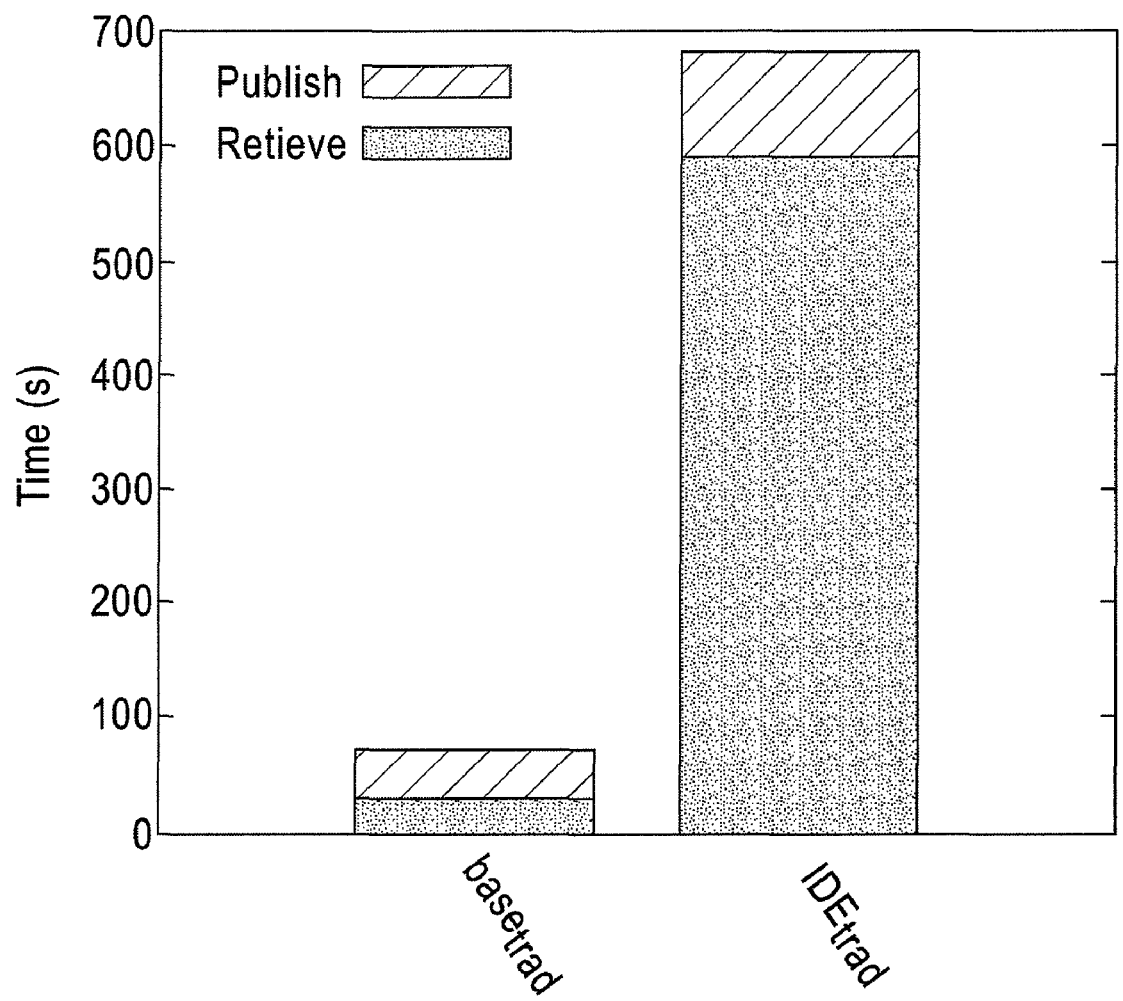
FIG. 5 shows the time it takes to customize Base and IDE images in a conventional manner.
Figure 6:
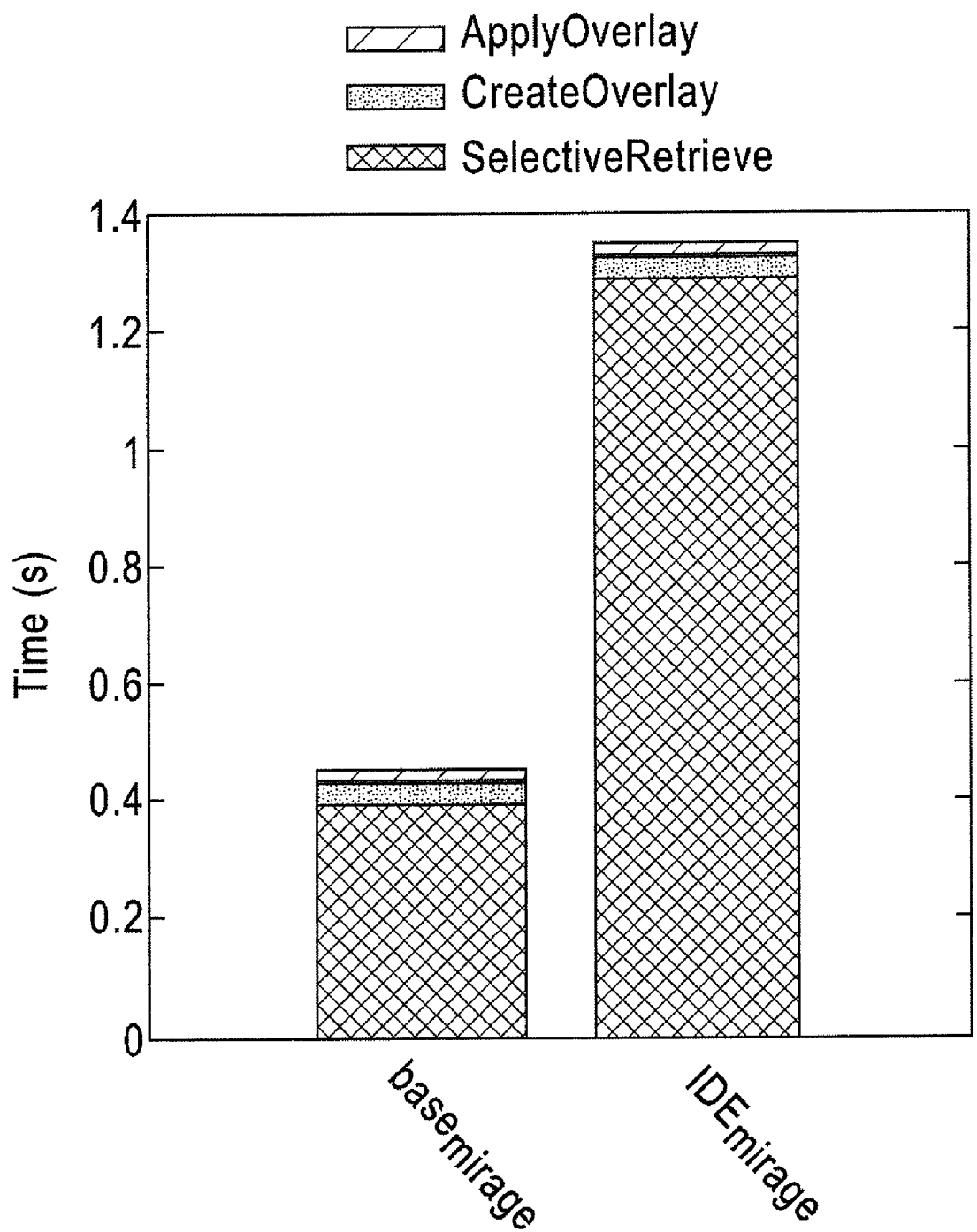
FIG. 6 shows the time it takes to customize Base and IDE images according to an exemplary embodiment of the present invention.

FIG. 5 shows the customization time for each master image with the conventional approach and FIG. 6 shows the time with the MIF-optimized approach described in Section 4.2. Compared with the conventional approach, the MIF optimizations yield a speedup of 120 on Base and 507 on IDE. With the optimized approach, storing each image in the Mirage repository consumes 40 KB of disk space; this includes storage for the new files, the overlay manifest, and new image manifests. The conventional approach consumes more storage because, instead of storing an overlay manifest, it stores a complete new file manifest; the traditional approach consumes 3 MB of disk space.

FIG. 6 shows that, even though selective retrieval fetches very few files from the repository, the time for selective retrieval exceeds the time to create and compose the overlay manifest. This is because selective retrieval scans the entire (large) file manifest, while the overlay manifest operations scale with the number of files in the overlay manifest. Thus, selective retrieval from Base takes 0.4 s, while selective retrieval from IDE, which has 3.3 times as many file manifest entries, takes 1.3 s.

5.5 Updates

This section evaluates the performance of MIF on the package-installation scenario from Section 4.3. In this scenario, a new package is installed on an image. We used two different packages: Wine, a Windows emulator, and Email, a large email/office productivity system. The Wine package is 8.6 MB and the Email package is 295 MB. In each case, the base image was Desktop.

Figure 7:
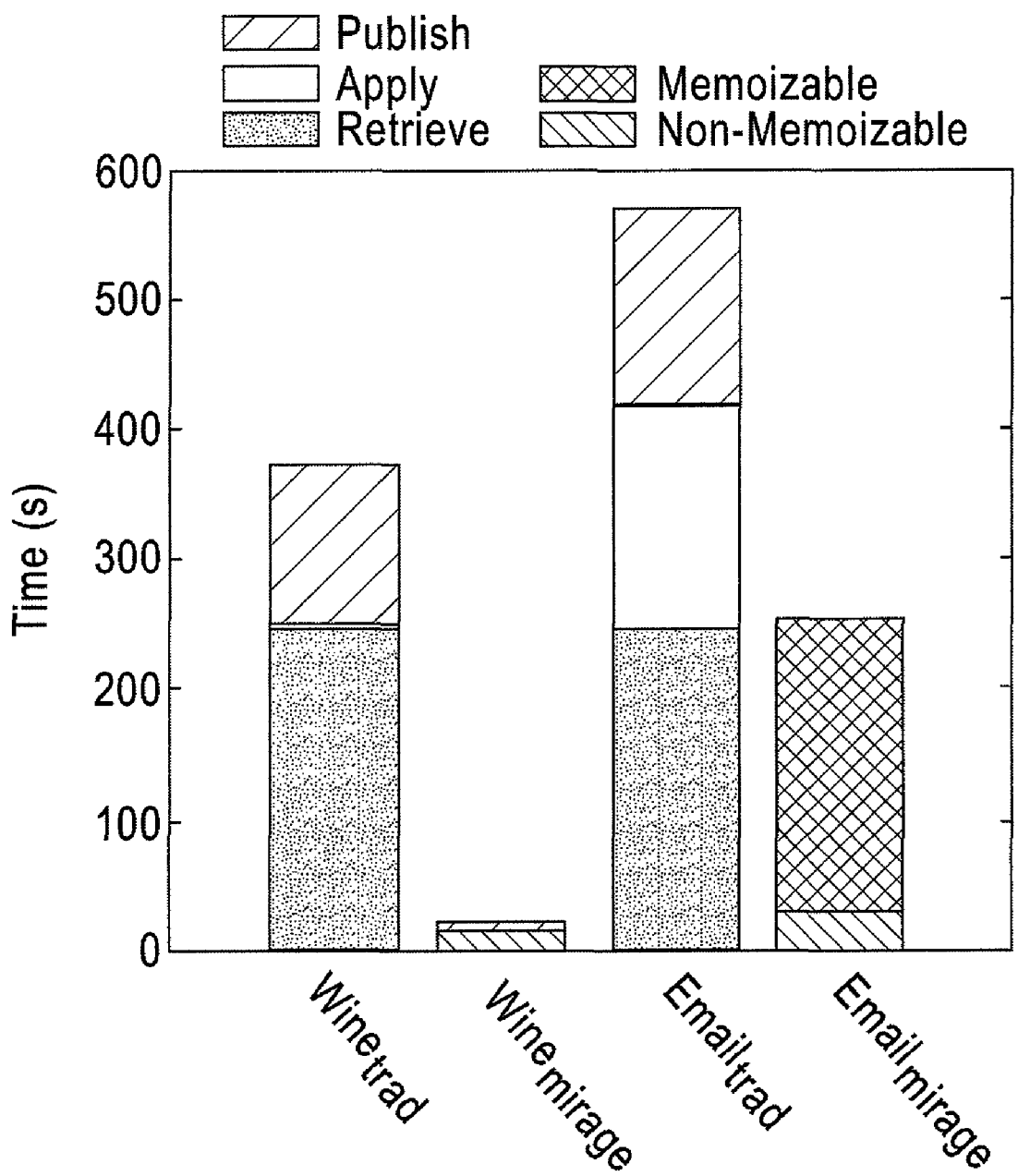
FIG. 7 shows the time it takes to install Wine and a large Email package on a Desktop image in a conventional manner and in a manner according to an exemplary embodiment of the present invention.

FIG. 7 shows the time for both the traditional and MIF-optimized installs. On Wine, the MIF-optimized install gives a speedup of 19 on the first install; for subsequent installs, memoization further increases the speedup to 23. On Email, the MIF-optimized install gives a speedup of 2.3 on the first install; subsequent installs see a speedup of 21.

For both packages, selective retrieval and manifest composition are critical for performance because retrieving and publishing the images account for most of the conventional install time. For Wine, memoization is not very important: only 18 percent of the optimized install is memoizable. However, memoization is critical for Email: 89 percent of that install is memoizable.

Selective retrieval greatly reduces the amount of data that must be retrieved from the repository. With selective retrieval, installing Wine requires 12 MB of data and installing Email requires 28 MB of data. Without selective retrieval, both installs require the entire image.

6. CONCLUSION

Disk-image files are an ideal format for managing the provisioning and execution of virtual machines, because the entire encapsulated state of the machine is kept as a single unit. However, such a representation is not well suited for the software management tasks that need to be performed on images when they are not executing.

Because virtual machine images are treated as data, they are easy to clone, extend, and snapshot, making virtual machine image sprawl a fast growing concern. As the number of virtual machines images that need to be maintained grows, the conventional disk image format for representing such images becomes cumbersome. The answer is not to constrain what the creation of more virtual machine images, which is part of what makes these images so appealing relative to physical machines. Rather, we instead addressed the issue of maintaining large virtual machine image repositories in a way that makes virtual machine image sprawl manageable.

The invention presents the Mirage image format for virtual-machine images, which is optimized for storing large numbers of images and for performing tasks such as search, update, and compose without having to start up each image. The Mirage image format also allows images to be reconstituted as conventional disk images prior to execution, so adopting this format does not disrupt established production environments.

A key concept underlying the Mirage image format is the decoupling of the file name to file content (and file metadata) mapping. By representing file content with compact content descriptors, we split the mapping into two parts: an image manifest that precisely describes the image and a store that stores the contents of the files. Such a design naturally exploits redundancies within and across images, enabling a better storage scaling than conventional disk image formats.

In addition, the image manifest makes the image's files explicit, enabling many image operations to be performed merely by scanning or manipulating the image manifest. As demonstrated above, substantial performance improvements for inventory control, customized deployment, and image upgrade tasks can be realized using this format.

Figure 8:
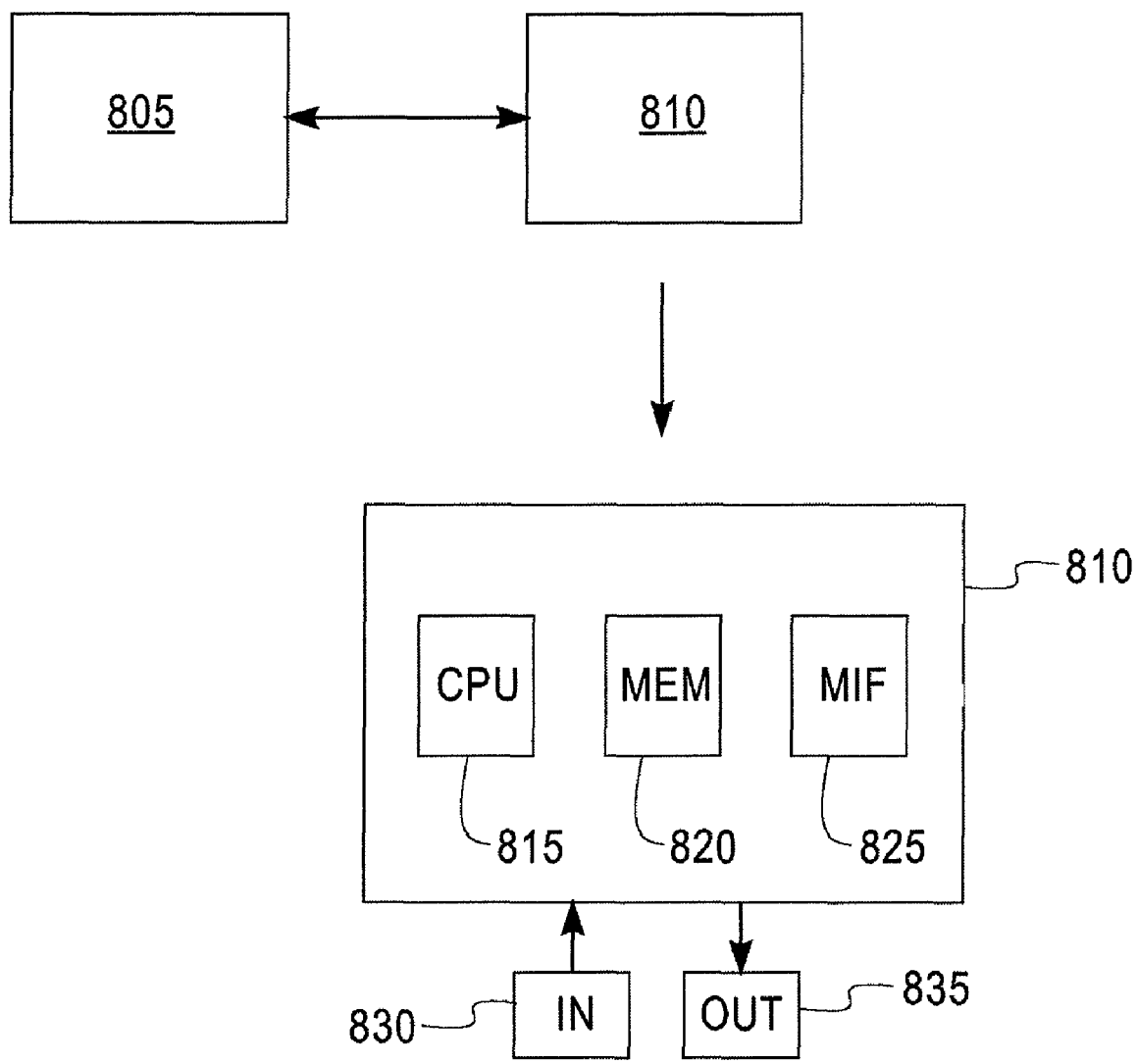
FIG. 8 shows a computer in which an exemplary embodiment of the present invention may be implemented.

It is understood that the present invention may be embodied and implemented on one or more computers. For example, as shown in FIG. 8, the catalog interface may be available to a user on a computer 805, while the remainder of the system (e.g., the indexer, encoder, repository, reconstituter and decoder) may be found in a separate computer 810. Although not shown the entire system (including the catalog interface) may be found on a single computer.

As shown in FIG. 8, the computer 810, which may be a laptop computer or server, includes a central processing unit (CPU) 815, a memory 820 and a MIF module 825 that includes program code for executing methods in accordance with exemplary embodiments of the present invention. The computer 810 is also coupled to input and output devices 830 and 835.

The memory 820 includes random access memory (RAM) and read only memory (ROM). The memory 820 can also include a database, disk drive, tape drive or a combination thereof. The input 830 is constituted by a keyboard or mouse and the output 835 is constituted by a display or printer.

It is also understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for creating a virtual machine image, comprising:
    storing a first image manifest for a first virtual machine image, the first image manifest including a mapping from file names of the first virtual machine image to unique content descriptors;
    storing a second image manifest for a second virtual machine image, the second image manifest including a mapping from file names of the second virtual machine image to unique content descriptors;
    creating a first overlay mapping by:
        placing a first file name and its unique content descriptor both from the second image manifest in the first overlay mapping; and
        placing a second file name and its unique content descriptor both from the first image manifest in the first overlay mapping if the second file name and its unique content descriptor are not mapped in the second image manifest; and
    constructing a third virtual machine image having an image manifest whose mapping is the first overlay mapping.

2. The method of claim 1, wherein the overlay mapping is a list of mappings.

3. The method of claim 2, wherein a first mapping in the list of mappings is the mapping in the first image manifest and a second mapping in the list of mappings is the mapping in the second image manifest.

4. The method of claim 1, further comprising:
storing a fourth image manifest for a fourth virtual machine image, the fourth image manifest including a mapping from file names of the fourth virtual machine image to unique content descriptors; and
creating a second overlay mapping by:
placing a third file name and its unique content descriptor both from the fourth image manifest in the second overlay mapping; and
placing a fourth file name and its unique content descriptor both from the first overlay mapping in the second overlay mapping if the fourth file name and its unique content descriptor are not mapped in the first overlay mapping; and
constructing a fifth virtual machine image having an image manifest whose mapping is the second overlay mapping.

5. A method for creating a virtual machine image, comprising:
creating an image manifest for a virtual machine image, the image manifest including a mapping from names of files in the virtual machine image to unique content identifiers of the files in the virtual machine image,
wherein the image manifest is associated with a repository that maps the file names to the unique content identifiers contained in the image manifest,
wherein the mapping is created by a sequence of overlay mapping elements,
wherein at least one of the elements includes a list of pairs, a first item of a pair being a file name and a second item of the pair being a unique content identifier,
wherein the element modifies an existing mapping by changing the existing mapping so that file names in the list are mappable to corresponding unique content identifiers.

6. The method of claim 5, wherein the image manifest when used in conjunction with the repository is the virtual machine image.

7. The method of claim 5, wherein each element modifies a mapping defined by preceding elements.

8. The method of claim 7, wherein an empty sequence specifies a null mapping in which no file names are mapped.

9. A method for creating a virtual machine image, comprising:
creating an image manifest for a virtual machine image, the image manifest including a mapping from names of files in the virtual machine image to unique content identifiers of the files in the virtual machine image,
wherein the image manifest is associated with a repository that maps the file names to the unique content identifiers contained in the image manifest,
wherein the mapping is created by a sequence of overlay mapping elements,
wherein at least one of the elements includes a deletion list that includes file names,
wherein the element modifies an existing mapping by changing the existing mapping so that file names in the deletion list are not mapped.

10. A method for creating a virtual machine image, comprising:
creating an image manifest for a virtual machine image, the image manifest including a mapping from names of files in the virtual machine image to unique content identifiers of the files in the virtual machine image,
wherein the image manifest is associated with a repository that maps the unique content identifiers contained in the image manifest to corresponding content,
wherein the mapping is created by a sequence of overlay mapping elements,
wherein at least one of the elements is a mapping from file names to unique content identifiers,
wherein the element modifies an existing mapping by changing the existing mapping so that file names that are mapped in the mapping of the element are mapped to values of which they are mapped to by the mapping of the element.

11. The method of claim 10, wherein the mapping of the element is the mapping of an existing image manifest.

12. A method for customizing a first virtual machine image, comprising:
formatting a second virtual machine image by creating an image manifest for the second virtual machine image that includes a mapping from file names of the second virtual machine image to unique content descriptors for file content of corresponding files in the second virtual machine image,
wherein the content descriptors enable reconstruction of the corresponding content from information included in a repository; and
wherein the mapping included in the image manifest of the second virtual machine image is specified by a sequence of overlay elements, the first overlay element being a reference to the image manifest of an original virtual machine image, the second overlay element being a mapping that maps a name of a modified file that has different content than the two virtual machine images to at least one of the content descriptors of the content in the second virtual machine image.

13. The method of claim 12, wherein information needed to reconstruct the content of the modified file in the second virtual machine image from the at least one content descriptor is contributed to the repository.

14. The method of claim 12, wherein the content descriptor for the modified file includes a collision resistant hash of the content of the modified file in the second virtual machine image.

15. The method of claim 12, wherein the second overlay element is a list of pairs that includes at least a single pair.

16. The method of claim 12, wherein the second overlay element is a reference to an image manifest whose mapping maps the name of the modified file to the content of the modified file in the second virtual machine image.

17. A method for creating a new virtual machine image, comprising:
incorporating an update to an original virtual machine image to a new virtual machine image, wherein the new virtual machine image is encoded as an image manifest containing a mapping from file names to unique content descriptors and a repository,
wherein content of the files of the new virtual machine image are reconstructed from the content descriptors using information in the repository, and the mapping is an overlay mapping with three elements,
wherein the first element is a reference to an image manifest for the original virtual machine image, the second element is a list of file names to be deleted from a mapping of the image manifest of the original virtual machine image, and the third element includes the mapping from the file names to the content descriptors, wherein the mapping of the third element maps the name of a file that is not mapped by the mapping of the image manifest of the original virtual machine image to a unique content descriptor, wherein the mapping of the third element contains the name of a file that is mapped by the mapping of the image manifest of the original virtual machine image to a unique content descriptor that is different from a unique content descriptor to which the file name is mapped by the mapping of the image manifest of the original virtual machine.

* * * * *